US006520594B2

(12) United States Patent
Amirola

(10) Patent No.: US 6,520,594 B2
(45) Date of Patent: Feb. 18, 2003

(54) AXLE PLATE FOR A WHEELCHAIR AND WHEELCHAIR THEREWITH

(75) Inventor: José Angel Otaola Amirola, Orduña (ES)

(73) Assignee: Sunrise Medical HHG Inc., Longmont, CO (US)

( * ) Notice: Subject to any disclaimer, the term of this patent is extended or adjusted under 35 U.S.C. 154(b) by 0 days.

(21) Appl. No.: 09/839,648

(22) Filed: Apr. 20, 2001

(65) Prior Publication Data

US 2002/0153764 A1 Oct. 24, 2002

(51) Int. Cl.[7] ........................................ B60B 25/00
(52) U.S. Cl. .............................. 301/11.06; 280/250.1
(58) Field of Search ..................... 301/111.06, 111.05, 301/111.01, 124.1; 280/250.1, 304.1, 657, 647, 43

(56) References Cited

U.S. PATENT DOCUMENTS 4,491,340 A * 1/1985 Von Grunberg et al. . 188/73.43
5,253,888 A * 10/1993 Friedrich ................ 280/250.1
5,743,545 A * 4/1998 Kunze et al. ............ 280/250.1
6,247,717 B1 * 6/2001 Lovins et al. ............ 280/250.1
6,345,833 B2 * 2/2002 Melgarejo et al. ....... 280/250.1

* cited by examiner

*Primary Examiner*—S. Joseph Morano
*Assistant Examiner*—Frantz F. Jules
(74) *Attorney, Agent, or Firm*—MacMillan, Sobanski & Todd, LLC

(57) ABSTRACT

A axle mounting plate comprises a main body portion. A first coupling extends from the main body portion. A second coupling extends from the main body portion. The first and second couplings each defines a generally C-shaped saddle. The saddles are generally at 90 degrees relative to one another. An axial sleeve is provided through the main body portion.

16 Claims, 6 Drawing Sheets

AXLE PLATE FOR A WHEELCHAIR AND WHEELCHAIR THEREWITH

BACKGROUND OF THE INVENTION

This invention relates in general to wheelchairs and, in particular, to wheelchair accessories. Most particularly, the invention relates to an axle mounting plate for mounting a drive wheel to a wheelchair side frame.

Axle mounting plates are well known. A typical axle mounting plate is a flat plate that is adapted to be supported in a vertical orientation between two longitudinally spaced rear vertical tubes of a wheelchair side frame. The flat plate is typically affixed to each one of the vertical tubes with conventional fasteners, such as hex head fasteners. The plate is usually provided with a series of vertically spaced holes or a series of vertically spaced longitudinally extending slots. These slots extend longitudinally, that is, in a direction between the front of the wheelchair and the back of the wheelchair. An axle, or an axle sleeve, can be inserted into any one of the slots and fixed to the plate. This permits the elevation of the frame to be adjusted relative to a supporting surface. By spacing the slots discrete distances apart, the elevation of the frame can be adjusted by discrete amounts. The axle or the axle sleeve can also be fixed to the plate at any point along the slots. This permits the distance between the caster and the rear drive wheel, or the wheelbase, to be adjusted. These adjustment features permit a wheelchair occupant or attendant to fine-tune the center of gravity of the wheelchair.

A problem with a conventional axle mounting plate is that it requires two rear vertical side frame tubes in spaced relation to one another. Such a plate is cumbersome to attach because the plate must be held adjacent the vertical tubes while inserting the fasteners through the plate and the tubes. Quite often, a nut must be held in place while the fastener is tightened. This could be a physical challenge to a wheelchair occupant with limited dexterity.

Another problem with a conventional axle mounting plate is that it can only be attached to rear vertical tubes of the side frame. This limits the amount of adjustment of the drive wheels to the configuration of the plate, since the plate cannot be moved relative to the side frame. The drive wheel axle may be adjusted relative to the plate but the plate cannot be adjusted relative to the side frame.

Yet another problem with a conventional axle mounting plate is that such a plate is typically made of steel due to its strong structural composition, a characteristic typically not found in lighter-weight materials. Steel is an expensive material that may require a considerable amount of time to tool. Steel is also subject to effects of corrosive elements.

What is needed is a low cost, user-friendly axle mounting plate that accommodates a greater level of adjustment and that is resistant to corrosion.

SUMMARY OF THE INVENTION

The present invention is directed towards an axle mounting plate that meets the foregoing needs. The axle mounting plate comprises a main body portion. A first coupling extends from the main body portion. A second coupling extends from the main body portion. The first and second couplings each defines a generally C-shaped saddle. The saddles are generally at 90 degrees relative to one another. An axial sleeve is provided through the main body portion.

In another embodiment of the invention, an axle mounting comprises a main body portion, first means for coupling the main body portion to a portion of the side frame, second means for coupling the main body portion to a portion of the side frame, means for receiving an axial, and means for reinforcing the said main body portion and said axial receiving means.

In yet another embodiment of the invention, a wheelchair has a side frame having a first tube and a second tube transverse to said first tube. An axle mounting plate comprises a main body portion. The main body portion has a first coupling engaging said first portion of said side frame. A second coupling engages a second portion of the side frame. The first and second portions of the side frame are transverse relative to one another. An axial sleeve is provided through the main body portion. A drive wheel has an axle supported by the axle sleeve.

DETAILED DESCRIPTION OF THE PREFERRED EMBODIMENT

Figure 1:
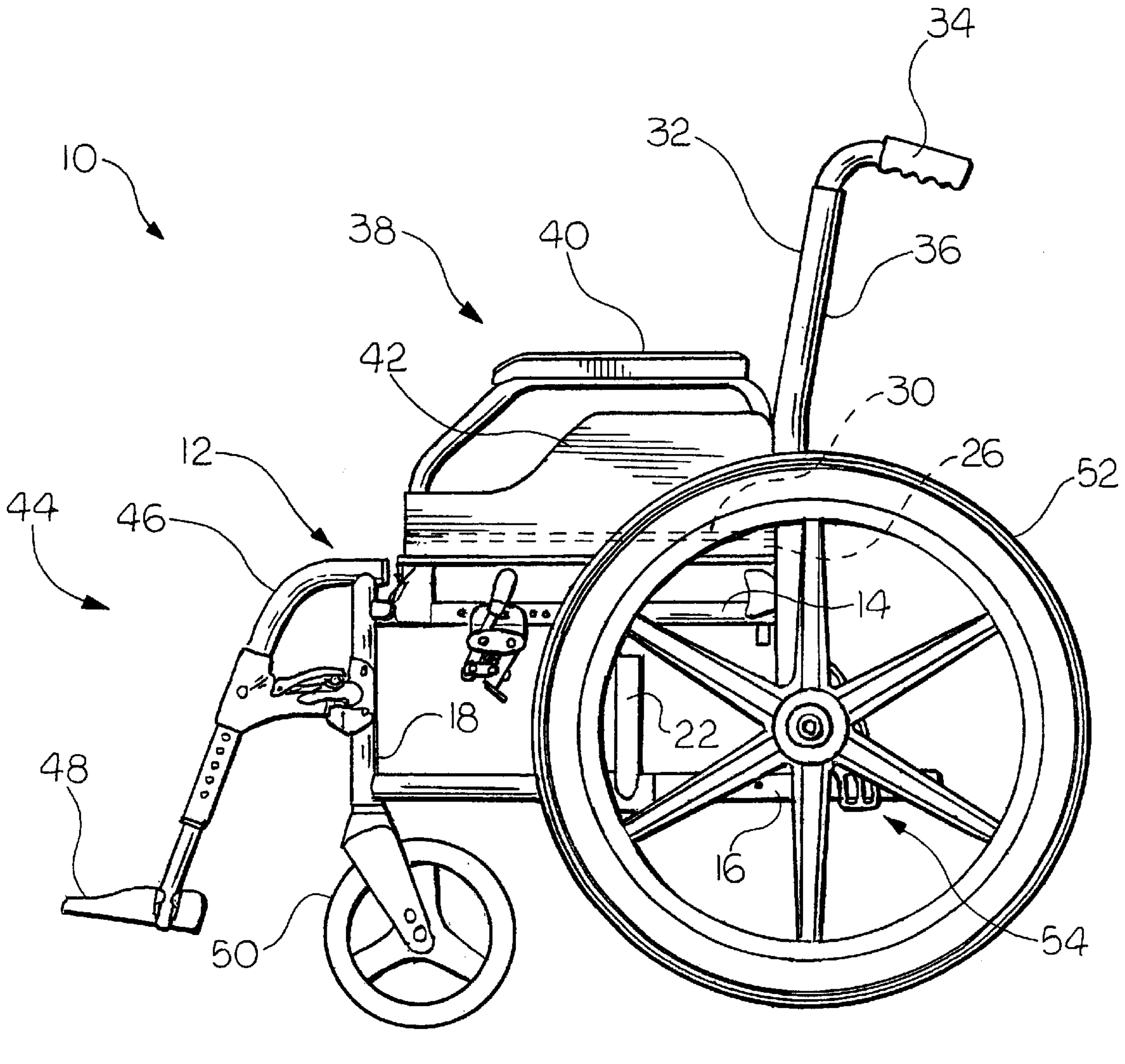
FIG. 1 is a side elevational view of a wheelchair.

Referring now to the drawings, there is illustrated in FIG. 1 a wheelchair 10. The wheelchair 10 comprises a pair of spaced apart side frames 12. The side frames 12 each includes an upper tube 14, a lower tube 16, a front tube 18, and a rear tube 20. These tubes are triangulated to form substantially rectangular shaped side frames.

The side frames 12 are joined together by cross tubes 22. Lower ends of the cross tubes 22 are pivotally connected to the lower tubes 16 of the side frames 12. Upper portions of the cross tubes 22 are movably connected relative to the upper tubes 14 by transverse braces (not shown). The cross tubes 22 are foldable to permit the wheelchair 10 to be folded into a compact form. The wheelchair 10 is foldable into a compact form to permit the wheelchair 10 to be easily transported and stored.

Upper ends of the cross tubes 22 are connected to seat tubes 26. The seat tubes 26 are adapted to be supported by upper tubes 14 of corresponding side frames 12. The upper tubes 14 can be provided with couplings, such as the saddles (not shown), for supporting the seat tubes 26 relative to the upper tubes 14. A seat sling 30 extends substantially horizontally between the seat tubes 26. The seat sling 30 forms a seat for supporting a wheelchair occupant.

Seat back tubes 32 are inserted in the rear tubes 20 of the side frames 12. A canvas seat back 36 extends substantially vertically between the seat back tubes 32. The seat back 36 can be adjustable in elevation by raising and lowering the seat back tubes 32 relative to the rear tubes 20. Upper ends of the seat back tubes 32 can be provided with attendant handles 34 to aid an attendant in maneuvering the wheelchair 10.

As shown in the drawings, the upper tubes 14 can be adapted to support armrest assemblies 38. The arm rests assemblies 38 can be comprised of armrest tubes (shown but not referenced) supporting armrests 40 and side guards 42. The armrests 40 are sufficiently low enough to permit a wheelchair occupant to gain access to rear drive wheels 52, which will be described herein below. The side guards 42 are provided to protect the wheelchair occupant's person or apparel from being caught in the spokes of the rear drive wheels 52.

Extending from the front of the wheelchair 10 are footrest assemblies 44. The footrest assemblies 44 are comprised of extension tubes 46 and footplates 48. The extension tubes 46 extend forwardly and downwardly from the front tubes 18 of the side frames 12. The footplates 48 are attached to the lower ends of the extension tubes 46, preferably by a pivotal connection. Lateral leg supports (not shown) can also be supported by the extension tubes 46.

Front casters 50 support the front end of the wheelchair 10 relative to a supporting surface. The front casters 50 can be affixed to the wheelchair 10 in any suitable manner. For example, the front casters 50 can be provided with stems (not shown) that are adapted to be inserted into lower open ends of the front tubes 18 of the side frames 12. Bearings (also not shown) can be provided in an annular space between the stems and front tubes 18. The stems are adapted to be in the front tubes 18 to enable the wheelchair 10 to be maneuvered. The stems are adapted to be in the front tubes 18 to enable the wheelchair 10 to be maneuvered.

Figure 2:
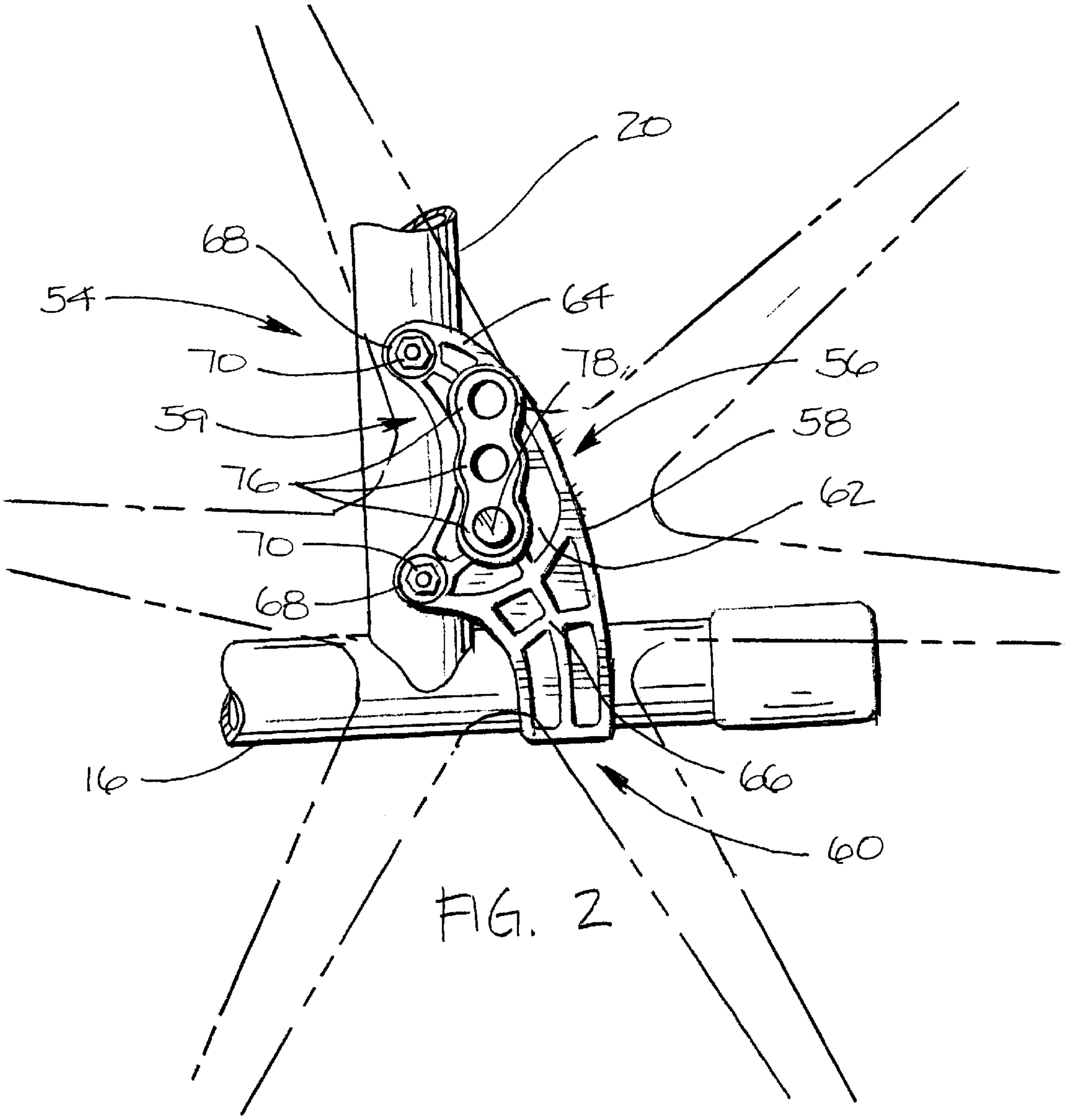
FIG. 2 is an enlarged side elevational view of an axle mounting plate according to the invention mounted to a portion of the wheelchair side frame with the hub and spokes of a drive wheel shown in phantom lines.
Figure 3:
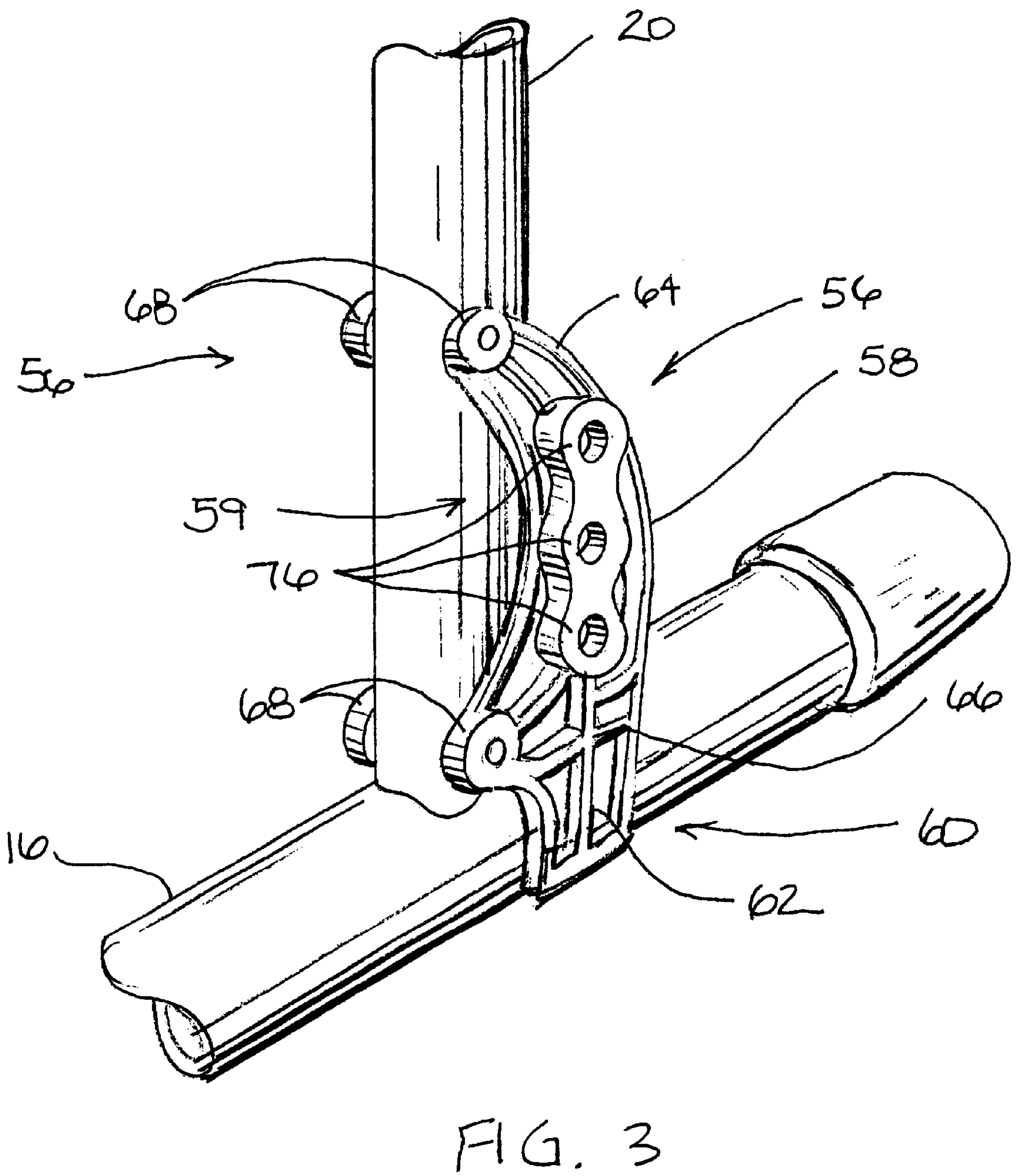
FIG. 3 is a front perspective view of the axle mounting plate and the portion of the rear side frame shown in FIG. 2.

Rear drive wheels 52 support the rear end of the wheelchair 10. The rear drive wheels 52 are adapted to be driven by the wheelchair occupant to propel and maneuver the wheelchair 10. In accordance with the preferred embodiment of the present invention, an axle mounting plate 54 is provided for mounting the drive wheel 52 to the side frame 12 of the wheelchair 10. The axle mounting plate 54, as shown in FIGS. 2 and 3, comprises a main body portion, generally indicated at 56. In accordance with the preferred embodiment of the invention, the main body portion 56 is comprised of an arcuate shaped portion 58 and coupling elements 59, 60 extending from the arcuate shaped portion 58. The arcuate shape of the arcuate shaped portion 58 is preferred because the arcuate shape is foot friendly, that is, the arcuate shape is easy and comfortable for an attendant to push.

The main body portion 56 is preferably of unitary construction. Although it may be formed of steel, it is preferably a plastic extrusion. The plastic extrusion includes medial portion 62 and reinforcement. The reinforcement is preferably in the form of a peripheral web 64 and interior web 66. The webs 64, 66 provide added thickness for the main body portion 56 beyond the thickness of the medial portion 62.

The axle mounting plate 54 has opposing sides and two bosses 68 in spaced relation to one another on each side of the plate 54. The bosses 68 are provided with apertures or bores through which fasteners may be inserted. The bores are preferably counterbores and the fasteners are preferably hex head fasteners that will be recessed in the bores when fastened or secured in place. As shown the drawings, the bosses 68 on one side of the plate 54 may be provided with hexagonal shaped recesses for receiving a conventional nut, such as the nut 70 shown. The recess will hold the nut 70 in place when fastening the plate 54 to the wheelchair side frame 12. This makes it possible to mount the axle mounting plate 54 to the side frame 12 of the wheelchair 10 single-handedly since the nut 70 does not need to be held while threading the fastener through the nut 70. The nut 70 is actually held by the recess.

Figure 5:
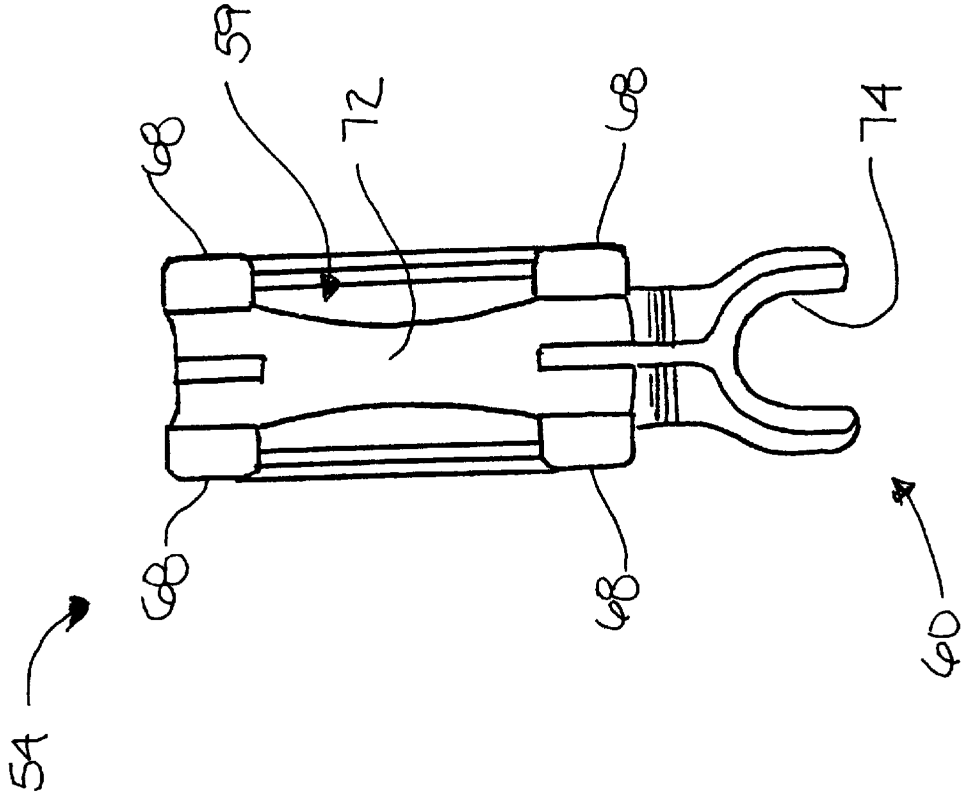
FIG. 5 is a front elevational view of the axle mounting plate shown in FIGS. 2 through 4.
Figure 4:
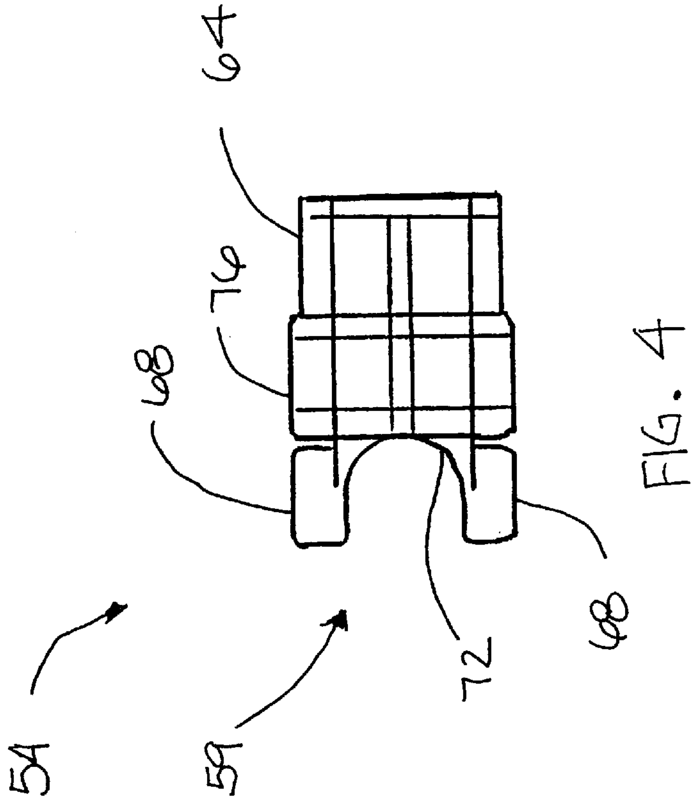
FIG. 4 is the top plan view of the axle mounting plate shown in FIGS. 2 and 3.
Figure 9:
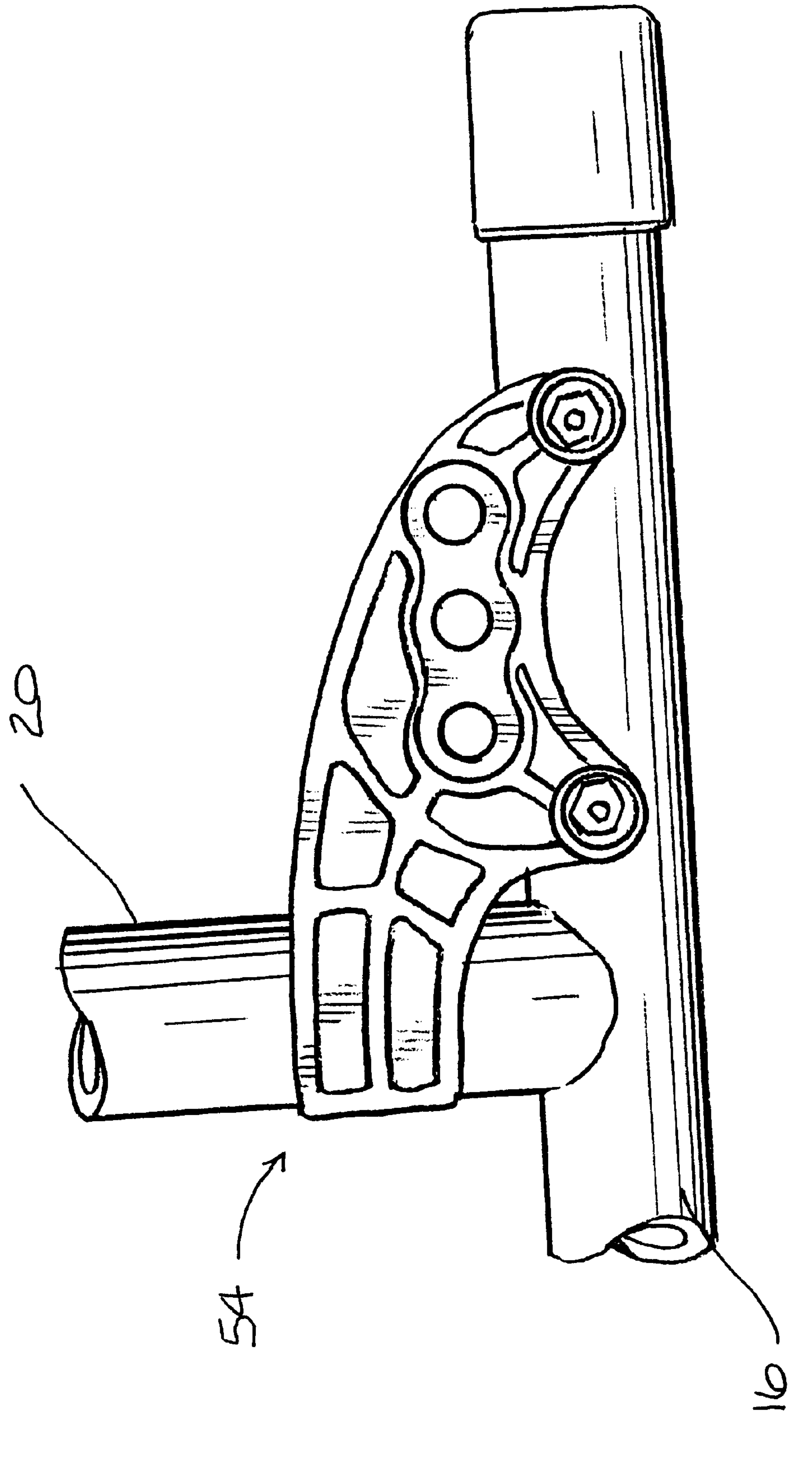
FIG. 9 is an enlarged side elevational view of the axle mounting plate mounted in a horizontal orientation and in a rearward facing position on a rear portion of the side frame.

In accordance with a preferred embodiment of the invention, a first one of the coupling elements 59 defines a generally C-shaped elongate saddle 72, as shown in the top plan view in FIG. 4. The saddle 72 is shaped to conform with and matingly engage the cylindrical tubular surface of the vertical rear tube 20 of the side frame 12, as shown in FIGS. 2 and 3, or the horizontal lower tube 16 of the side frame 12, as shown in FIG. 9. A second one of the coupling elements 60 also defines a generally C-shaped saddle 74, as shown in elevation in FIG. 5. This saddle 74 is adapted to conform with and matingly engage the cylindrical tubular surface of the horizontal lower tube 16 of the side frame 12, as shown in FIGS. 2–3, or the vertical rear tube 20 of the side frame 12, as shown in FIG. 9. In a preferred embodiment of the invention, the two saddles 72, 74 described above are oriented 90 degrees relative to one another. As shown in the drawings, this provides a three-point connection between the axle mounting plate 54 and the side frame 12. This three-point connection is formed between the first coupling element 59 and the second coupling element 60, and more particularly, between the two fasteners extending through the bosses 68 and the second coupling element 60. The three-point connection provides a very strong connection for the axle mounting plate 54. Unlike the prior art axle mounting plate, the present invention does not require two rear vertical side frame tubes. Instead, it requires only one rear vertical side frame tube 20.

In spaced relation to the bosses 68 are a plurality of axle sleeves 76. The axle sleeves 76 are preferably formed integrally with the arcuate-shaped portion 58 of the axle mounting plate 54. Each one of the axle sleeves 76 is adapted to receive the axle of the rear drive wheels 52. The axle sleeves 76 are sufficiently long enough and thick enough to provide the requisite axial support for a drive wheel axle. In addition, the peripheral web 64, the interior webs 66, and the axle sleeves 76 are triangulated to produce a very strong, low cost, lightweight structure that exhausts fewer resources.

Figure 6:
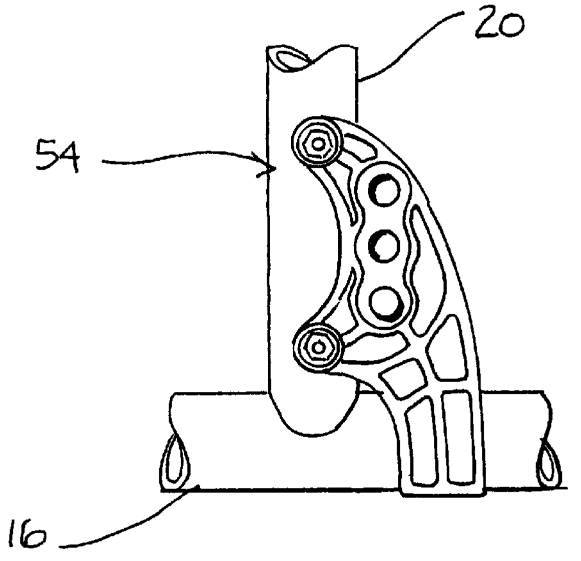
FIGS. 6 through 8 are side elevational views of the axle mounting plate at different elevations due to the axle of a drive wheel being inserted in a high position, a medium position, and a low position, respectively, through the axle mounting plate.
Figure 7:
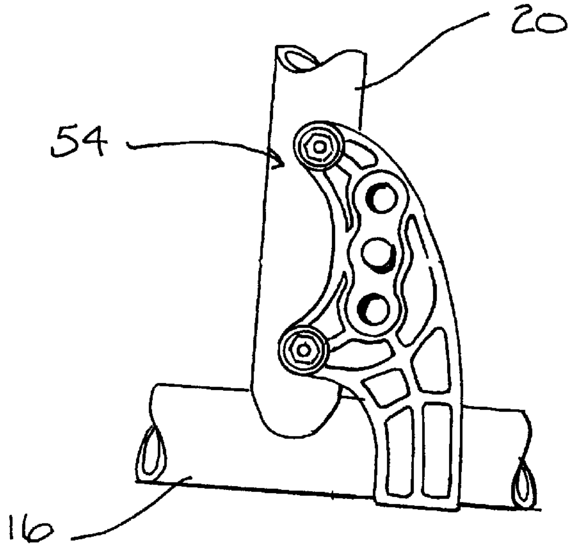
Figure 8:
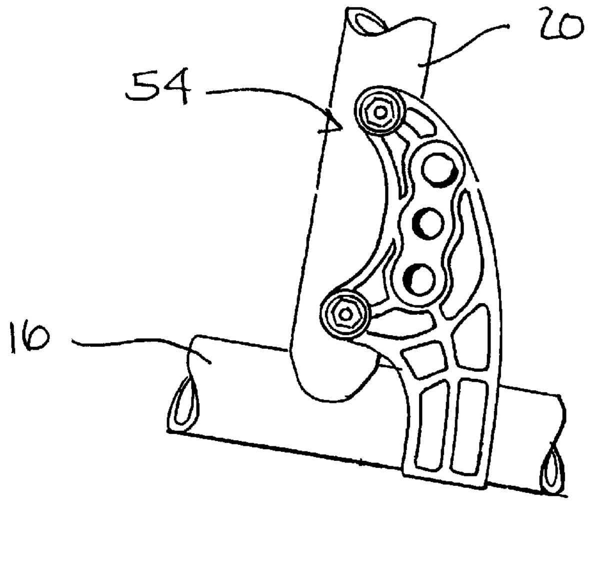

The axle sleeves 76 are preferably spaced apart by discrete distances. Since the sleeves 76 are spaced discrete distances apart, the elevation of the side frame 12 relative to the floor may be adjusted by discreet amounts simply by inserting the drive wheel axle 78 into a different axle sleeve 76. For example, if each one of these sleeves 76 are spaced one-half inch apart, the elevation of the rear portion of the side frame 12 can be adjusted in one-half inch increments simply by moving the drive wheel axle 78 from one axle sleeve 76 to an adjacent axle sleeve 76. The adjustment of the rear portion of the side frame 12 is illustrated with reference to FIGS. 6–8. In FIG. 6, a drive wheel axle 78 is inserted in the lower axle sleeve 76 to support the rear portion of the side frame 12 in a high position. In FIG. 7, the drive wheel axle 78 is inserted in the center axle sleeve 76 to support the rear portion of the side frame 12 in an intermediate position. In FIG. 8, the drive wheel axle 78 is inserted in the upper axle sleeve 76 to support the rear portion of the side frame 12 in a low position. Adjusting the elevation of the rear portion of the side frame 12 adjusts the inclination of the seat sling 30. Various sized front casters 50 may be employed to adjust the elevation of the front portion of the side frame 12 to offset the adjustment in the rear portion of the side frame 12 as described above. The resultant effect is to raise the entire elevation of the seat sling 30.

The axle mounting plate 54 can be mounted as shown in FIGS. 2–3 and 6–8 to permit the elevation of the rear portion of the side frame 12 to be adjusted. Alternatively, the axle mounting plate 54 can be mounted as shown in FIG. 9 to permit the wheelbase of the wheelchair 10 to be adjusted. It should be noted that the axle mounting plate 54 is not limited to the orientations shown in the drawings and described above. For example, the axle mounting plate 54 is oriented in a forward facing direction in FIGS. 2–3 and 6–8. The orientation can be changed by positioning the axle mounting plate 54 in a rearward facing direction, or forward of the rear tube 20 instead of behind as shown. This permits the wheelbase to be adjusted while still permitting the elevation of the rear portion of the side frame 12 to be adjusted. This illustration holds true for the orientation shown in FIG. 9 as well. That is to say, the orientation of the axle mounting plate 54 can be changed by positioning the axle mounting plate 54 with its greatest dimension in a horizontal direction and forward of the rear tube 20. The latter arrangement does not lend itself to providing any adjustment in elevation, but it permits a greater amount of adjustment in the wheelbase.

In accordance with the provisions of the patent statutes, the principle and mode of operation of this invention have been explained and illustrated in its preferred embodiment. However, it must be understood that this invention can be practiced otherwise than as specifically explained and illustrated without departing from its spirit or scope.

What is claimed is:

1. An axle mounting plate for mounting a drive wheel to a side frame of a wheelchair, said axle mounting plate comprising:

a main body portion;

a first coupling extending from said main body portion;

a second coupling extending from said main body portion, said first and second couplings each defining a generally C-shaped saddle, said saddles being generally at 90 degrees relative to one another; and an axial sleeve through said main body portion.

2. The axle mounting plate according to claim 1, wherein said main body portion is comprised of an arcuate shaped portion.

3. The axle mounting plate according to claim 1, wherein said main body portion is of unitary construction.

4. The axle mounting plate according to claim 1, wherein said axle mounting plate is a plastic extrusion.

5. The axle mounting plate according to claim 1, further including webbing for reinforcing said axle sleeves.

6. The axle mounting plate according to claim 1, further including opposing sides and two bosses in spaced relation to one another on each side, said bosses being provided with bores through which fasteners are adapted to be inserted.

7. The axle mounting plate according to claim 6, wherein at least one of said bosses includes a counterbore for receiving a fastener head and another one of said bosses includes a hexagonal shaped recess for receiving a nut that is threadably engageable with said fastener.

8. In combination:

a wheelchair having a side frame having a first portion and a second portion transverse to said first portion;

an axle mounting plate comprising:

a main body portion having a first coupling engaging said first portion and a second coupling engaging said second portion; and an axial sleeve through said main body portion; and a drive wheel having an axle supported by said axle sleeve.

9. The axle mounting plate according to claim 8, wherein said first and second couplings extend from said main body portion.

10. The axle mounting plate according to claim 8, wherein said first and second couplings are spaced 90 degrees apart.

11. The axle mounting plate according to claim 8, wherein said main body portion is comprised of an arcuate shaped portion.

12. The axle mounting plate according to claim 8, wherein said main body portion is of unitary construction.

13. The axle mounting plate according to claim 8, wherein said axle mounting plate is a plastic extrusion.

14. The axle mounting plate according to claim 8, further including webbing for reinforcing said axle sleeve.

15. The axle mounting plate according to claim 9, further including opposing sides and two bosses in spaced relation to one another on each side, said bosses being provided with bores through which fasteners are adapted to be inserted.

16. The axle mounting plate according to claim 15, wherein at least one of said bosses includes a counterbore for receiving a fastener head and another one of said bosses includes a hexagonal shaped recess for receiving a nut that is threadably engageable with said fastener.

* * * * *